(12) United States Patent
Kadowaki et al.

(10) Patent No.: US 8,617,257 B2
(45) Date of Patent: Dec. 31, 2013

(54) DEVICE FOR STACKING SUCCESSIVE SEPARATOR AND SHEET ELECTRODE

(75) Inventors: Munehiro Kadowaki, Yonezawa (JP); Kiyoko Abe, Yonezawa (JP); Kazunori Ozawa, Tokyo (JP)

(73) Assignee: Enax, Inc., Tokyo (JP)

( * ) Notice: Subject to any disclaimer, the term of this patent is extended or adjusted under 35 U.S.C. 154(b) by 511 days.

(21) Appl. No.: 12/598,325

(22) PCT Filed: May 2, 2007

(86) PCT No.: PCT/JP2007/059397
§ 371 (c)(1), (2), (4) Date: Oct. 30, 2009

(87) PCT Pub. No.: WO2008/139561
PCT Pub. Date: Nov. 20, 2008

(65) Prior Publication Data
US 2010/0132308 A1 Jun. 3, 2010

(51) Int. Cl.
*H01M 10/38* (2006.01)
(52) U.S. Cl.
USPC ....... 29/623.1; 53/212; 414/788.1; 414/789.5
(58) Field of Classification Search
None
See application file for complete search history.

(56) References Cited

U.S. PATENT DOCUMENTS

2006/0051652 A1 3/2006 Samuels

FOREIGN PATENT DOCUMENTS

| JP | 3-230479 A | 10/1991 |
| JP | 9-274935 A | 10/1997 |
| JP | 2000-1261 A | 1/2000 |
| JP | 2000-251923 A | 9/2000 |
| JP | 2004-22449 A | 1/2004 |
| JP | 2005-50583 A | 2/2005 |
| WO | WO 02/095858 A1 | 11/2002 |

OTHER PUBLICATIONS

Extended European Search Report dated Sep. 23, 2011, for Application No. 07742832.4.

*Primary Examiner* — Ula C Ruddock
*Assistant Examiner* — Tony Chuo
(74) *Attorney, Agent, or Firm* — Birch, Stewart, Kolasch & Birch, LLP

(57) ABSTRACT

There is provided a simple-structured and inexpensive device for stacking a successive separator and sheet electrodes which can protect an end portion of a sheet electrode when folding the successive separator, and which enables smooth folding of the separator to improve the productivity. The device comprises a stacking stage 10 which adsorbs and holds a leading end of the tape-like separator S, and on which sheet electrodes P, N and the separator S are successively stacked, separator reciprocating means for reciprocating the tape-like separator S on the stacking stage 10 with the stacking stage 10 being as a center, and a folding guide member 20 which comes close/moves apart relative to the stacking stage 10, covers both side ends of the stacked sheet electrode P, N in the moving direction of the separator S, and guides folding of the separator S accompanied by a reciprocal movement of the separator S at both side ends of the sheet electrode.

16 Claims, 10 Drawing Sheets

DEVICE FOR STACKING SUCCESSIVE SEPARATOR AND SHEET ELECTRODE

TECHNICAL FIELD

The present invention relates to a stacking device that manufactures a stacked body having a successive separator folded in a zigzag manner and sheet electrodes each sandwiched between a folded portion of the successive separator.

BACKGROUND ART

Patent Literature 1: JPH9-274935A
Patent Literature 2: JP2000-251923A

Recently, lithium ion secondary batteries attract attentions as an example of secondary batteries which can be applied to an electric vehicle, a hybrid vehicle, a UPS (uninterrupted power supply), or the like, and easily accomplishing miniaturization and a large capacity. A lithium ion secondary battery generally comprises an internal electrode pair (stacked body) in sheet type having a sheet positive electrode, comprised of a sheet cathode collector and a cathode active material coated thereon, a sheet negative electrode, comprised of a sheet anode collector and an anode active material coated thereon, and a separator, wherein the sheet positive electrode and the sheet negative electrode are stacked with each other via the separator. The lithium ion secondary battery also comprises a battery casing airtightly sealing and covering the internal electrode pair, and containing an electrolysis solution inside the battery casing, and a positive electrode terminal and a negative electrode terminal respectively connected to the positive electrode of the internal electrode pair and the negative electrode thereof inside the battery casing. In the case of charging, lithium ions from the cathode active material move via the electrolysis solution and the separator, and are intercalated to the anode active material, while in the case of discharging, the lithium ions move in the reverse order. In this fashion, the secondary battery performs charging/discharging.

As an example of the foregoing internal electrode pair comprising the separator and the sheet electrodes, there is known a stacked body having a separator present between sheet electrodes and formed successively in order to suppress any battery breakdown due to an internal short-circuit and any influence thereof to surrounding parts (see, for example, patent literatures 1 and 2).

Patent literature 1 discloses a lithium ion secondary battery which has an internal electrode pair (stacked body) that comprises electrode units successively stacked one another. Each electrode unit has a separator farmed of two microporous films pasted together in an envelope-like form, and a sheet electrode accommodated in the interior of the envelope-like separator in order to suppress any propagation effect of an internal short-circuit and to improve the heat dissipation performance.

Moreover, patent literature 2 discloses a rectangular secondary battery having an internal electrode pair (stacked body) that comprises a long and strip-shaped separator which has a folded bottom end and which is folded in a zigzag manner, and positive/negative sheet electrodes alternately arranged between respective folded portions of the successive separator in order to eliminate a dead space and to increase the battery capacity.

DISCLOSURE OF INVENTION

Problem to be Solved by the Invention

However, the conventional arts disclosed in the foregoing patent literatures respectively have the following problems.

For example, according to the conventional art disclosed in patent literature 1, since the sheet electrode is accommodated in the separator formed of the microporous films pasted together in the envelope-like form, automation of such an accommodation process is difficult, and it requires a cutting process of the separator, so that the workability and the productivity are poor. Moreover, when a composite separator of inorganic materials is used, powders falling down from a cut plane cause any short-circuit of the stacked body, and cause pasting of the separator by thermal welding with a resin film difficult, so that the material of the separator which can be used is limited.

Moreover, according to the conventional art disclosed in patent literature 2, in an assembling process, it is necessary to fold the separator while precisely adjusting the position of the sheet positive/negative electrodes and that of the separator to form the stacked body, resulting in poor workability and productivity. Furthermore, when the separator is folded, unreasonable force may be applied to an end portion of the sheet electrode present between a folded portion, so that the position of the electrode may be misaligned and the end portion of the electrode may be subjected to a mechanical damage. Such misalignment of the sheet electrode and mechanical damage thereto in assembling cause deterioration of the performance like reduction of the battery capacity, and an internal short-circuit.

Furthermore, there is a demand for developing a stacking device which can flexibly cope with changes in the size, shape, and material of a sheet electrode/separator in accordance with an application of a secondary battery which is recently widespread in various fields.

The present invention has been made in view of the foregoing problems of the conventional arts, and it is an object of the present invention to provide a device for stacking a successive separator and a sheet electrode which can protect an end portion of the sheet electrode when folding the successive separator while folding such a separator smoothly, and which can improve the productivity.

Means for Solving the Problem

To achieve the object, a device of the present invention is for stacking a successive tape-like separator and a sheet electrode, sequentially stacks the separator and the sheet electrode while folding the successive separator to form a stacked body, and the device comprises: a stacking stage which adsorbs and holds a leading end of the tape-like separator, and on which the sheet electrode and the separator are sequentially stacked; separator reciprocating means for reciprocating the tape-like separator above the stacking stage with the stacking stage being as a center; and a folding guide member which comes close or moves apart relative to the stacking stage so as to cover sides of both ends of the stacked sheet electrode, the sides being in a moving direction of the separator, and which guides folding of the separator accompanied by a reciprocal movement of the separator at both ends of the sheet electrode.

According to this configuration, since the device has a stacking stage which adsorbs and holds a leading end of the tape-like separator, and on which the sheet electrode and the separator are sequentially stacked, separator reciprocating means for reciprocating the tape-like separator above the stacking stage with the stacking stage being as a center, and a folding guide member which comes close/moves apart relative to the stacking stage so as to cover sides of both ends of the stacked sheet electrode, the sides being in a moving direction of the separator, and which guides folding of the separator accompanied by a reciprocal movement of the separator at both ends of the sheet electrode, a cutting step of the separator needed every time a sheet electrode is stacked can be omitted to improve the productivity, and any damage to an electrode end portion inherent to a direct contact to the sheet electrode when the tape-like reciprocated separator is folded, and a homogeneous folding of the tape-like separator can be easily accomplished.

The separator reciprocating means may comprise a roller pair that the tape-like separator is inserted therebetween, the roller pair being configured to reciprocate along the stage surface with the stacking stage being as a center.

According to this configuration, it is possible to realize, with a simple configuration, the separator reciprocating means for enabling sequential folding at end portions of respective sheet electrodes without cutting the successive separator.

The stacking device may further comprise: a positive electrode accommodating unit which accommodates plural sheet positive electrodes; a negative electrode accommodating unit which accommodates plural sheet negative electrodes; positive electrode holding/moving means for holding a sheet positive electrode one by one in the positive electrode accommodating unit, and for moving and supplying the sheet positive electrode on the stacking stage; and negative electrode holding/moving means for holding a sheet negative electrode one by one in the negative electrode accommodating unit, and for moving and supplying the sheet negative electrode on the stacking stage, wherein the separator reciprocating means, the positive electrode holding/moving means, and the negative electrode holding/moving means reciprocate in an integrated manner on substantially a same straight line.

According to this configuration, since the separator reciprocating means, the positive electrode holding/moving means and the negative electrode holding/moving means reciprocate in an integrated manner on substantially the same straight line, for example, the device can be easily applied to manufacturing of a secondary battery which requires stacking of a sheet positive electrode and a sheet negative electrode both are formed of different materials. Moreover, it becomes possible to automatically, sequentially, and alternately stack the sheet positive electrode and the sheet negative electrode via the successive separator on the stacking stage, the degree of freedom for moving supply of each electrode and for folding of the separator are reduced, so that the configuration is made compact and the controlling is simplified, thereby contributing increment of a capacity of the battery, improvement of the productivity, and cost reduction.

The separator reciprocating means may be arranged at the substantial center between the positive electrode holding/moving means and the negative electrode holding/moving means, the stacking stage may be arranged at the substantial center between the positive electrode accommodating unit and the negative electrode accommodating unit, and an offset distance in a horizontal direction between the separator reciprocating means and each of the electrode holding/moving means is set to be substantially a half of an offset distance in a horizontal direction between the stacking stage and each of the electrode accommodating units.

When, for example, there are plural electrode holding/moving means of the same polarity arranged in the horizontal direction, the offset distance in the horizontal direction between the separator reciprocating means and each of the electrode holding/moving means is an offset distance in the horizontal direction between the center (e.g., the roller pair) of the separator reciprocating means and an arrangement center of the plural electrode holding/moving means. Likewise, the offset distance in the horizontal direction between the stacking stage and each of the electrode accommodating units is an offset distance in the horizontal direction between an arrangement center of the stacking stage and an arrangement center of each sheet electrode accommodating unit.

According to this configuration, since the offset distance in the horizontal direction between the roller pair and each of the electrode holding/moving means is set to be substantially a half of the offset distance in the horizontal direction between the stacking stage and each of the electrode accommodating units, a moving operation of moving a sheet electrode of one polarity from the corresponding electrode accommodating unit to the stacking stage, a moving operation of moving a sheet electrode of another polarity from the stacking stage to the corresponding electrode accommodating unit, and a folding operation of folding the successive separator at an end of the electrode can be simultaneously carried out with a simple configuration, thereby significantly improving the productivity.

The stacking device may further comprise: a positive electrode accommodating unit which accommodates plural sheet positive electrodes; a negative electrode accommodating unit which accommodates plural sheet negative electrodes; positive electrode holding/moving means for holding a sheet positive electrode one by one in the positive electrode accommodating unit, and for moving and supplying the sheet positive electrode on the stacking state; negative electrode holding/moving means for holding a sheet negative electrode one by one in the negative electrode accommodating unit, and for moving and supplying the sheet negative electrode on the stacking stage, and wherein the positive electrode holding/moving means and the negative electrode holding/moving means reciprocate in an integrated manner on a circular orbit which contacts a trajectory of the separator reciprocating means at a substantial center of the stacking stage.

According to this configuration, as the separator reciprocating means and each of the electrode holding/moving means are independently driven and controlled, it becomes possible to automatically, sequentially, and alternately stack the sheet positive electrode and the sheet negative electrode via the successive separator on the stacking stage, so that the stacking device can be easily applied to manufacturing of a secondary battery, and a folding timing of the successive separator at a predetermined position and a stacking timing of the sheet electrode can be precisely adjusted and controlled, thereby improving the quality of a stacked body.

The positive electrode accommodating unit and the negative electrode accommodating unit may be arranged on the circular orbit, and an open angle between the positive electrode holding/moving means and the negative electrode holding/moving means may be set to be substantially equal to an arrangement angle between the stacking stage and each of the electrode accommodating units.

The open angle is an angle of the predetermined circular orbit of each electrode holding/moving means relative to the rotation center. The arrangement angle is an angle between the stacking stage and each of the electrode accommodating units on the predetermined circular orbit relative to the rotation center.

According to this configuration, a moving operation of moving a sheet electrode of one polarity from the corresponding electrode accommodating unit to the stacking stage, a moving operation of moving a sheet electrode of another polarity from the stacking stage to the corresponding electrode accommodating unit, and a folding operation of folding the successive separator at an end portion of the electrode can be simultaneously carried out, thereby further improving the productivity.

The open angle between the positive electrode holding/moving means and the negative electrode holding/moving means may be changeable arbitrarily.

According to this configuration, a layout of each electrode accommodating units can be changed, and a stacking timing can be adjusted appropriately in accordance with the material of the separator and that of the sheet electrode, so that it becomes possible to cope with changes in the arrangement configuration and the stacking operation more easily and flexibly in accordance with an application.

The folding guide member and/or any one of the electrode holding/moving means may be always holding a stacked body with the stacking stage when the stacked body is formed on the stacking stage.

According to this configuration, any misalignment of the sheet electrode when a stacked body is formed on a stacked body can be surely suppressed.

Each of the foregoing units and means are arranged such that a projection plane of the folding guide member and that of a leading end of the electrode holding/moving means on the stacking stage do not interfere with each other.

According to this configuration, a stacked body formed on the stacking stage can be always held with the stacking stage without any mutual interference between the folding guide member and/or any one of the electrode holding/moving means, and the guide member arranged between the separator and the sheet electrode can be smoothly pulled out, thereby surely suppressing any damage to the sheet electrode and any misalignment thereof inherent to coming close/moving apart operation of the folding guide member.

In the foregoing configurations, the tape-like separator may be hung across plural rollers, and at least one of the plural rollers may be movable in a direction of gravitational force.

According to this configuration, a roller configured to be movable in the direction of gravitational force always apply constant tension to the successive tape-like separator to suppress any generation of a slack and a wrinkle of the separator, and any mechanical damage due to accidental application of force to the sheet electrode can be suppressed, resulting in improvement of the reliability and the quality.

The stacking stage may have a height adjustable in accordance with the number of stacked sheet electrodes.

According to this configuration, the folding position (height) of the separator can be always maintained at constant in accordance with the number of stacked sheet electrodes, so that a homogeneous folding of the separator can be carried out with a simple control, resulting improvement and maintaining of the quality.

The stacking device may further comprise gripping means for gripping both ends of a stacked body in a stacking direction, the stacked body comprising a separator and a sheet electrode both stacked on the stacking stage, and wherein the gripping means comprises a rotation mechanism which enables winding of the separator around a circumference of the stacked body.

According to this configuration, since the stacking device further has the gripping means with the rotation mechanism, the circumference of the stacked body having the separator and the sheet electrode can be wrapped by the tape-like separator without a manual work, so that any misalignment of the sheet electrode configuring the stacked body can be surely suppressed, resulting in improvement and maintaining of the quality.

The separator may be multiplexed by stacking plural tape-like separators each of which is successive.

According to this configuration, even if there is a defect like a pinhole in one separator, another separator multiplexed in the stacked direction can back up such a defect, resulting in further improvement of the reliability.

The present invention can be appropriately applied to the separator formed of a complex material of inorganic chemical compounds or wholly aromatic polyamide material which has a high heat resistance, but is difficult to cut, is likely to be damaged at a cutting step, and has a brittleness that becomes a problem when folded.

Furthermore, when the sheet positive electrode is a lithium-ion-battery positive electrode comprising, for example, an aluminum metal foil having both side surfaces coated with a cathode active material, and the sheet negative electrode is a lithium-ion-battery negative electrode comprising a copper metal foil having both side surfaces coated with an anode active material, the present invention can be appropriately applied to, using the successive separator, manufacturing of an internal electrode pair (stacked body) of a lithium ion secondary battery which is small in size and has a large capacity.

Effect of the Invention

According to the present invention, there is provided a device for stacking a successive separator and a sheet electrode which can protect an end portion of the sheet electrode when folding the successive separator while folding such a separator smoothly, and which can improve the productivity.

Figure 1:
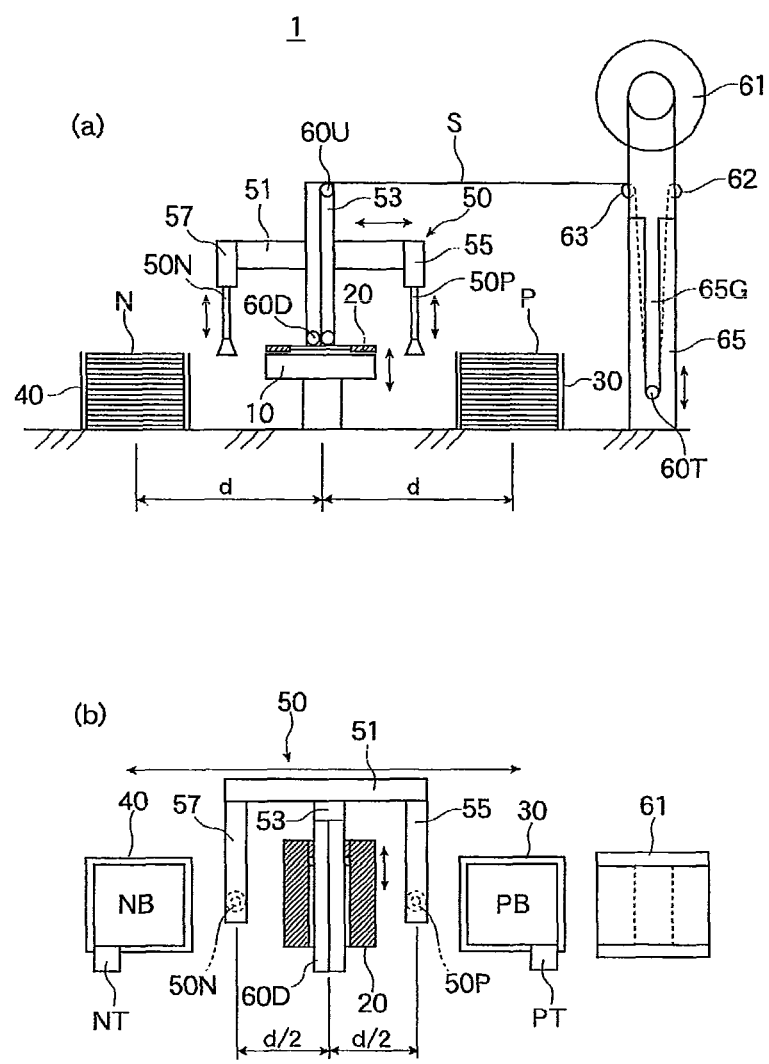
FIG. 1 is an exemplary diagram showing a whole configuration of a stacking device according to a first embodiment of the present invention.

DESCRIPTION OF REFERENCE NUMERALS 1, 1A Stacking device
10 Stacking stage
10a Groove
20, 21, 22 Guide member
20R, 20L, 21R, 21L Guide side
30 Positive electrode accommodating unit
40 Negative electrode accommodating unit
50 Slide reciprocating unit
50R Rotational reciprocating unit
50P, 50P1, 50P2 Positive electrode adsorbing pad
50N, 50N1, 50N2 Negative electrode adsorbing pad
51 Slide member
53 Vertical arm
55 Right arm
57 Left arm
60T Tension roller
60U Upper roller
60D Bottom roller pair
61 Tape unit
62, 63 Guide roller
65G Guide groove
70 Stacked body
100 Gripper unit
107 Rotation shaft
110 Upper gripper
120 Bottom gripper
511 Rotation supporting member
513 Curved arm
513R Right arm unit
513L Left arm unit
θ Open angle (arrangement angle)
C Circular orbit
G Gripper
P Sheet positive electrode
N Sheet negative electrode
S Separator

BEST MODE FOR CARRYING OUT THE INVENTION

First Embodiment

An explanation will be given of the first embodiment of the present invention with reference to accompanying drawings. Note that in the following embodiment, an explanation will be given of an example case that a lithium ion secondary battery is manufactured to which the present invention is applied.

First, an explanation will be given of a brief overview of a device (hereinafter, stacking device) for manufacturing a stacked body according to the embodiment with reference to FIG. 1. FIG. 1(a) is an exemplary front view showing a whole configuration of the stacking device of the embodiment, and FIG. 1(b) is an exemplary plain view. FIG. 1(a) shows that a separator is hung across plural rollers and fed to a stacking stage, while FIG. 1(b) shows a state that the separator is omitted for the purpose of clarification.

As shown in FIG. 1, a stacking device 1 of the present invention comprises a successive tape-like separator S hung across plural rollers, a stacking stage 10 on which a sheet positive electrode P and a sheet negative electrode N are alternately stacked on a successive tape-like separator S, and which can move up and down, a folding guide member 20 which can move back and forth (come close and come off) relative to the stacking stage 10 while maintaining a predetermined height, and which guides sequential folding of the separator S in a zigzag manner at a predetermined position (height), a positive electrode accommodating unit 30 which is arranged at the entry side (in the figure, right) of the stacking stage 10 along a direction in which the separator S is fed (in the figure, from right to left), and which accommodates the plural sheet positive electrodes P in a stacked condition, a negative electrode accommodating unit 40 which is arranged at the delivery side (in the figure, left), and which accommodates the plural sheet negative electrodes N in a stacked condition, a slide reciprocating unit 50 which is arranged above the stacking stage 10, and which can reciprocate between the stacking stage 10 and the positive electrode accommodating unit 30/negative electrode accommodating unit 40, and a non-illustrated device controller which controls operations of those units.

The slide reciprocating unit 50 in the embodiment has a slide member 51 which is arranged at the back face side of the stacking stage 10 and which is caused to reciprocate in the horizontal direction by a non-illustrated drive unit like a motor. The slide member 51 has a vertical arm 53 which is attached to the approximate center thereof and which extends in the vertical direction. The slide member 51 also has a right arm 55 and a left aim 57 which are provided at both ends thereof and which are formed so as to substantially-horizontally protrude along the stacking stage 10 (in the figure, from back to front of the figure). The vertical arm 53 has an upper roller 60U which is provided at an upper end portion thereof so as to substantially-horizontally protrude along the stacking stage 10, and across which the separator S is hung, and has a pair of bottom rollers 60D provided at a bottom end portion so as to substantially-horizontally protrude along the vicinity of a top upper face of the stacking stage 10. The roller pair 60D configures separator reciprocating means of the embodiment, and more particularly, is substantially-parallel to the folding guide member 20 which moves forward to a predetermined position on the stacking stage 10, and is so attached as to have a height that the roller pairs 60D is positioned to the vicinity of a front face of the guide member 20. The right arm 55 has a positive electrode adsorbing pad 50P which is provided at a leading end thereof, adsorbs and holds the sheet positive electrode P one by one from the positive electrode accommodating unit 30 and moves it to the stacking stage 10, and is telescopic in the vertical direction. Likewise, the left arm 57 has a negative electrode adsorbing pad 50N which is provided at a leading end thereof, adsorbs and holds the sheet negative electrode N one by one from the negative electrode accommodating unit 40 and moves it to the stacking stage 10, and is telescopic in the vertical direction. That is, the slide reciprocating unit 50 of the embodiment has the upper roller 60U, the bottom roller pair 60D, the positive electrode adsorbing pad 50P, and the negative electrode adsorbing pad 50N which are formed together as a single unit, and are caused to reciprocate integrally and successively as a whole unit relative to the stacking stage 10 by a single drive unit.

Note that in the embodiment, each the positive electrode adsorbing pad 50P and the negative electrode adsorbing pad 50N configuring individual electrode holding/moving means is telescopic in the vertical direction by means of a conventionally-known air cylinder which is driven by a non-illustrated air source, and has a pad member which is so attached to a leading end (bottom end) of the individual adsorbing pad as to be able to elastically deform in the vertical direction through an elastic member like a spring.

Regarding the arrangement of the upper roller 60U and that of the bottom roller pair 60D in the embodiment, it is possible to arrange those units shifted in the horizontal direction, instead of their vertical arrangement in the straight line, but from the standpoint of suppressing any unnecessary force to be applied to the separator S and the folding guide member 20 other than the folding direction when the separator S is folded to accomplish smooth folding, and of ensuring a sufficient movable area of the electrode adsorbing pad 50P at a tape unit 61 side, it is preferable that the upper roller 60U and the bottom roller pair 60D should be arranged in a substantially-straight line in the vertical direction.

Likewise, regarding the attachment height of the bottom roller pair 60D which configures the separator reciprocating means of the present invention, from the standpoint of suppressing any unnecessary force to be applied to the separator S and the folding guide member 20, it is preferable to set the arrangement height that the bottom roller pair 60D is positioned above the vicinity of the folding guide member 20 arranged at a predetermined height.

The stacking stage 10 of the embodiment has plural fine pores which are formed in the top face thereof, and which adsorb and fix a leading end portion of the separator S by suctioning of a non-illustrated air source. The stacking stage 10 can ascend and descend (move up and down) by means of a non-illustrated motor in accordance with a stacking condition (the number of stacked electrodes and the like) of the sheet electrodes P, N and the separator S so that a folding position when the separator S is folded always becomes a predetermined position (height).

As shown in FIG. 1(a), for example, the tape-like successive separator S is fed from a tape unit 61 provided at a top of a supporting pole 65 having a guide groove 65G, is hung across a tension roller 60T which can move up and down in the direction of gravitational force along the guide groove 65G formed in the vertical direction downwardly from the tape unit 61, a pair of guide rollers 62, 63 which are provided above the tension roller 60T, and which are respectively fixed and arranged at the entry side and the delivery side of the separator feeding direction, and the upper roller 60U (attached to the vertical arm 53 of the slide reciprocating unit 50)
arranged at substantially the same height as those of the guide rollers 62, 63, and is fed in between rollers of the bottom roller pair 60D (attached to the vertical arm 53 of the slide reciprocating unit 50) arranged downwardly of the upper roller 60U, so that a leading end of the separator S is adsorbed and fixed on the stacking stage 10.

As the slide reciprocating unit 50 provided with the bottom roller pair 60D which configures the separator reciprocating means of the present invention is reciprocated and moved in the lateral direction relative to the stacking stage 10 along a stage surface of the stacking stage 10, the separator S having the leading end adsorbed and fixed on the stacking stage 10 is successively fed in such a manner as to be sequentially foldable on the stacking stage 10.

According to the stacking device 1 of the present invention, as is most clearly shown in FIG. 1(b), the positive electrode accommodating unit 30, the positive electrode adsorbing pad 50P, the stacking stage 10, the negative electrode adsorbing pad 50N, and the negative electrode accommodating unit 40 are arranged in a substantially-straight line along the feeding direction (moving direction) of the separator S, and as shown in FIG. 1(a), offset distances in the horizontal direction between the stacking stage 10 and individual electrode accommodating units 30, 40 are set to be d which are equal values.

Conversely, as shown in FIG. 1(b), offset distances in the horizontal direction between the center of the bottom roller pair 60D and individual electrode adsorbing pads 50P, 50N are set to be a half (d/2) of the offset distance d between the stacking stage 10 and individual electrode accommodating units 30, 40.

According to the slide reciprocating unit 50 of the embodiment, as the roller pair 60D which configures the separator reciprocating means and individual electrode adsorbing pads 50P, 50N which adsorb and hold the sheet electrode P, N and supply it to the stacking stage 10 are formed together as a single unit, and as the positional relationships among the foregoing units are set to be the foregoing predetermined arrangement, as will be discussed in detail later, an operation of feeding a sheet electrode of one polarity to the stacking stage 10, an operation of moving a sheet electrode of another polarity into the electrode accommodating unit, and an operation of folding the separator S at a predetermined position can be carried out simultaneously, thereby significantly improving the productivity.

As is exemplary shown in FIG. 1(b), the sheet electrode P, N for a lithium ion secondary battery to which the stacking device of the present invention can be applied is formed in a substantially-rectangular shape, and has an electrode lead PT, NT at an end portion of one side. More specifically, in the embodiment, the sheet positive electrode P is formed by coating a non-illustrated cathode active material on both surfaces of a cathode collector PB formed of an aluminum rectangle (about 50 by 50 mm) having a thickness of, for example, 5 to 30 μm. Likewise, the sheet negative electrode N is formed by coating a non-illustrated anode active material on both surfaces of an anode collector NB formed of a copper rectangle (about 50 by 50 mm) having a thickness of, for example, 5 to 30 μm. Further, the positive electrode lead PT provided on the sheet positive electrode P is made of aluminum like the cathode collector PB, and the negative electrode lead NT provided on the sheet negative electrode N is made of copper like the anode collector NB. Note that no active material is coated on the positive electrode lead PT and the negative electrode lead NT.

The sheet electrodes P, N are accommodated in the respective electrode accommodating units 30, 40 in a stacked condition in such a way that the positions of the electrode leads (e.g., PT) of the same polarity are aligned in the corresponding electrode accommodating unit 30, 40 and the electrode lead (e.g., NT) of the sheet electrode of the opposite polarity is positioned at the opposite side (in the embodiment, the positive electrode lead PT is positioned at the right end of the sheet positive electrode P, while the negative electrode NT is positioned at the left end of the sheet negative electrode N).

The separator S can be one which has an electrical insulation property and has a sufficient strength with respect to adhesion to the sheet positive electrode P and the sheet negative electrode N, such as a porous film, a nonwoven fabric, or a mesh, but from the standpoint of adhesiveness and safeness, it is preferable that the separator S should be a monolayer porous film of polyethylene or polypropylene, or multilayer porous film thereof. However, when a stacked body is formed using the successive separator S like the present invention, the stacking device of the present invention can be more appropriately used with an inorganic material composite separator (e.g., microporous separator (separion: registered trademark) with inorganic chemical compounds) formed of a nonwoven fabric or a separator formed of a wholly aromatic polyamide material (nonwoven fabric, aramid, nylon: registered trademark) having a high heat resistance but also having a brittleness that becomes a problem at the time of, in particular, folding.

Figure 2:
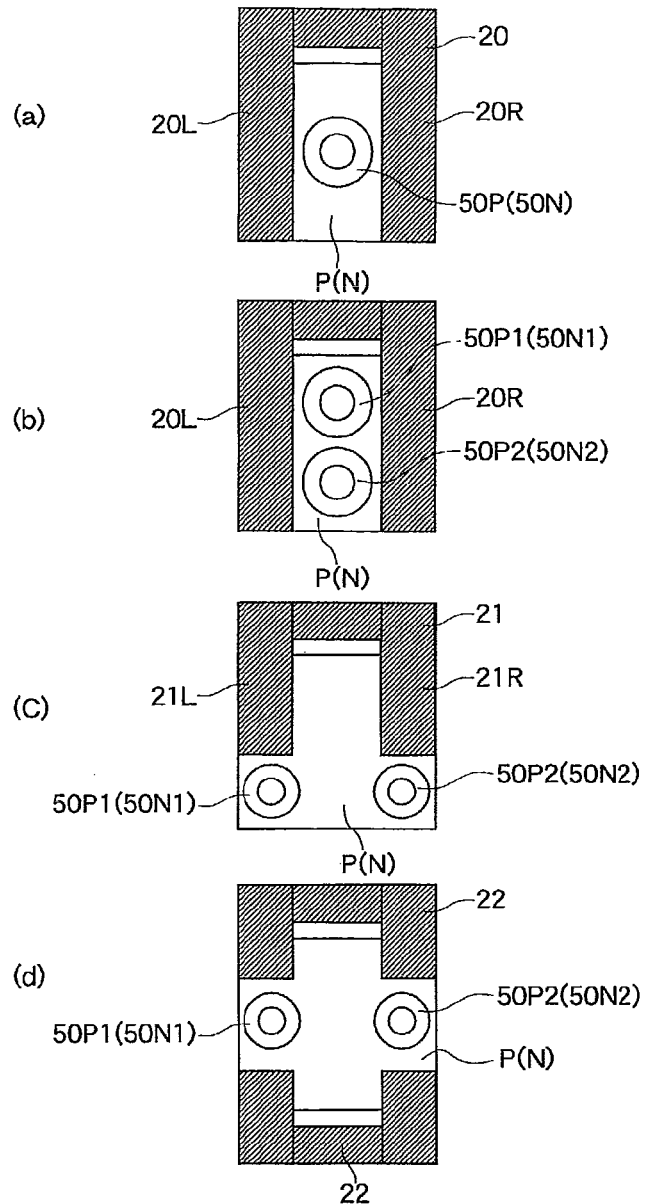
FIG. 2 is an exemplary diagram showing a positional relationship between a folding guide member and an electrode adsorbing pad of the present invention.

The folding guide member 20 which functions as a guide when the separator S is folded in a zigzag manner can move back and forth (come close and come off) relative to the stacking stage 10 by means of a non-illustrated actuator, and as shown in FIG. 2, is formed in a shape having guide sides 20R, 20L which cover both end sides (both end sides substantially-orthogonal to the moving direction of the separator S) of the sheet electrodes P, N on the stacking stage 10 when the folding guide member 20 is moved forward.

Such a folding guide member 20 can have any shape and configuration if it can guide the folding of the sheet electrode P, N at the time of stacking while protecting an end portion of the sheet electrode P, N when the separator S is folded. For example, the guide side 20R, 20L may be formed of a bar-like member, and a configuration which can adjust a clearance between the guide side 20R and the guide side 20L so that a folding position of the tape-like separator S can be arbitrarily adjusted can be employed. Moreover, it is preferable that the folding member 20 should be foamed of a material which enables smooth backward/forward movement even if the folding member 20 contacts the sheet electrode P, N or the separator S, and it is preferable to perform surface finishing to reduce the friction resistance of a surface. More specifically, using a stainless steel or the like, it is preferable to perform electrochemical polishing to achieve a surface roughness of 0.5 μm or so.

Regarding the number of arranged folding guide members 20, that of the electrode adsorbing pads 50P (50N), the positions, and the sizes thereof, those can be set arbitrarily as far as the guide member 20 and the electrode adsorbing pad 50P (50N) do not interfere with each other. That is, the shapes, the sizes, the positions, and the numbers thereof can be set in such a way that the guide member 20 does not interfere with the ascending/descending electrode adsorbing pad 50P (50N) (a projection plane of the folding guide member 20 and that of a leading end portion of the electrode adsorbing pad 50P (50N) on the stacking stage do not interfere with each other) when the guide member 20 moves forward over the stacking stage 10. Employed in the embodiment is an arrangement as shown in FIG. 2(*a*) that the guide sides 20R, 20L of the guide member 20 in a shape like a rectangle with one side omitted cover all sides of the both end portions of the sheet electrode P (N) in the moving direction of the separator S, and one electrode adsorbing pad 50P (50N) is arranged between the guide sides 20R, 20L when the guide member 20 and the electrode adsorbing pad 50P (50N) approaches a predetermined position over the stacking stage 10. However, as shown in FIG. 2(*b*), an arrangement that two electrode adsorbing pads 50P1, 50P2 (50N1, 50N2) are arranged between the guide sides 20R, 20L in the backward/forward direction (depth direction) may be employed. Moreover, as shown in FIG. 2(*c*), a guide member 21 having short guide sides 21R, 21L may be formed, and the electrode adsorbing pads 50P1, 50P2 (50N1, 50N2) may be arranged at leading end positions. Furthermore, when a large sheet electrode P, N is to be sandwiched, for example, as shown in FIG. 2(*d*), a guide member may be formed of two members 22, 22 each having a shape like a rectangle having one side omitted, and the electrode adsorbing pads 50P1, 50P2 (50N1, 50N2) may be arranged therebetween. When a larger adsorption area is required in order to adsorb a larger sheet electrode, for example, a tabular adsorbing plate having multiple pores formed in a surface thereof may be used.

Next, an explanation will be given of an operation of the stacking device having the foregoing structure according to the embodiment with reference to FIGS. 3 to 9.

Figure 3:
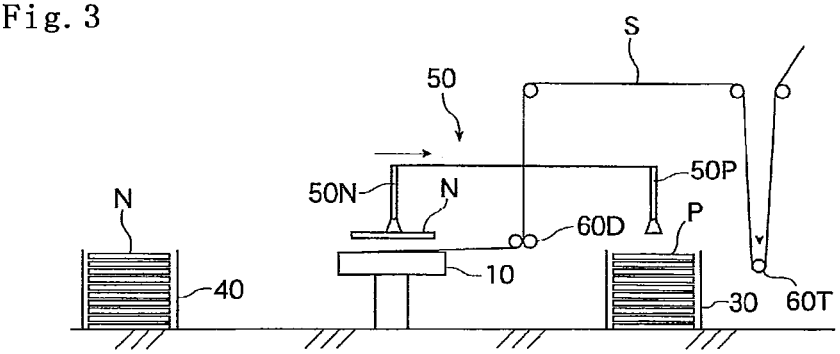
FIG. 3 is an exemplary diagram for explaining a stacking operation by the stacking device of the first embodiment of the present invention.

ST0: First, as an initial condition, a leading end portion of the separator S hung across the plural rollers is manually guided on the stacking stage 10, and is adsorbed and fixed by air from the underneath of the stacking stage 10. At this time, the stacking stage 10 is moved down at a height lower than a predetermined height that folding of the separator S is possible, and the folding guide member 20 is moved apart from the stacking stage 10. Next, as shown in FIG. 3, with one electrode adsorbing pad (e.g., the negative electrode adsorbing pad 50N) being adsorbing one sheet negative electrode N, the slide reciprocating unit 50 is slid in such a way that the negative electrode adsorbing pad 50N is positioned at a predetermined position (a predetermined position in the horizontal direction in the figure, and is called a stacking position) above the stacking stage 10 where stacking of the sheet negative electrode N becomes possible. At this time, since the distance between the bottom roller pair 60D and the electrode adsorbing pad 50P, 50N is set to be a half (d/2) of the offset distance d between the stacking stage 10 and the electrode accommodating unit 30, 40, the bottom roller pair 60D in which the separator S is fed moves to the right of the stacking stage 10, and another electrode adsorbing pad (e.g., the positive electrode adsorbing pad 50P) is automatically moved to a predetermined position (a predetermined position in the horizontal direction in the figure, and is called an adsorbing position) above the positive electrode accommodating unit 30 where adsorption of the corresponding sheet electrode P becomes possible.

Together with the horizontal movement (in the embodiment, from left to right) of the slide reciprocating unit 50, the tension roller 60T moves in the vertical direction (in the embodiment, from up to down). Accordingly, when the bottom roller pair 60D reciprocates over the stacking stage 10 together with the separator S, the tension roller 60T which can move in the direction of gravitational force always applies constant tension to the separator S, thereby suppressing generation of any slack and wrinkle of the separator S. Moreover, since the tension roller 60T and the center of the tape unit 61 are aligned in a substantially-straight line in the vertical direction, even when the diameter of the separator S wound up on the tape unit 61 decreases along with a stacking operation, the tension applied to the separator S can be maintained stably and constantly.

Figure 4:
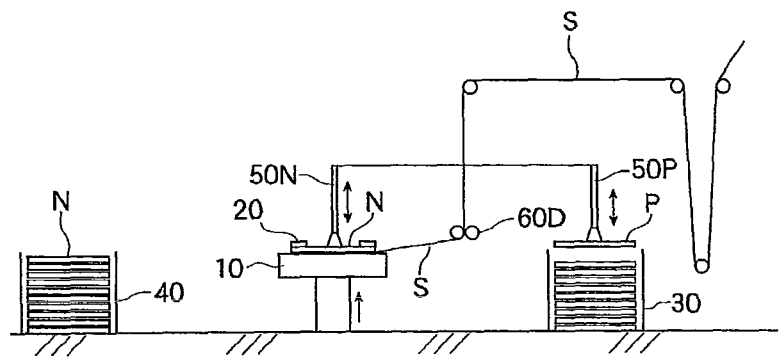
FIG. 4 is an exemplary diagram for explaining the stacking operation by the stacking device of the first embodiment of the present invention.

ST1: Subsequently, as shown in FIG. 4, the negative electrode adsorbing pad 50N holding a sheet negative electrode N is elongated over the stacking stage 10 to press the separator S against the stacking stage 10 via the sheet negative electrode N, and the positive electrode adsorbing pad 50P at the adsorbing position is elongated and contracted to adsorb and hold a sheet positive electrode P in the positive electrode accommodating unit 30. At the same time, the folding guide member 20 is moved forward to a predetermined position (a predetermined position in the frontward/backward direction in the figure, and is called a folding position) above the stacking stage 10 where folding of the separator S becomes possible, the stacking stage 10 is moved up to hold the separator S and the sheet negative electrode N between the stacking stage 10 and the folding guide member 20, and the negative electrode adsorbing pad 50N is contracted in order to avoid any interference with the guide member 20 at the time of a sliding operation. When the stacking stage 10 is moved up, the adsorbing pad elastically supported at the leading end of the negative electrode adsorbing pad 50N is elastically compressed, so that the negative electrode adsorbing pad 50N follows the ascending operation of the stacking stage 10 while holding the separator S and the sheet negative electrode N with the stacking stage 10.

Figure 5:
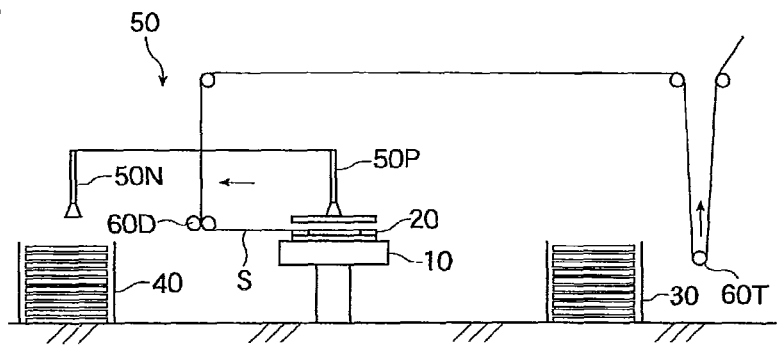
FIG. 5 is an exemplary diagram for explaining the stacking operation by the stacking device of the first embodiment of the present invention.

Next, as shown in FIG. 5, the slide reciprocating unit 50 is slid by a horizontal distance d so that the bottom roller pair 60D is moved to an opposite side of the stacking stage 10 (in the embodiment, left of the stacking stage 10). Accordingly, the separator S is folded by the folding guide member 20 at the predetermined folding position, the negative electrode adsorbing pad 50N is moved to the adsorbing position, and the positive electrode adsorbing pad 50P is moved to the stacking position. That is, an operation of moving the positive electrode adsorbing pad 50P from the adsorbing position to the stacking position, an operation of moving the negative electrode adsorbing pad 50N from the stacking position to the adsorbing position, and an operation of folding the separator S at the predetermined folding position with constant tension are simultaneously carried out, thereby significantly improving the productivity.

Figure 6:
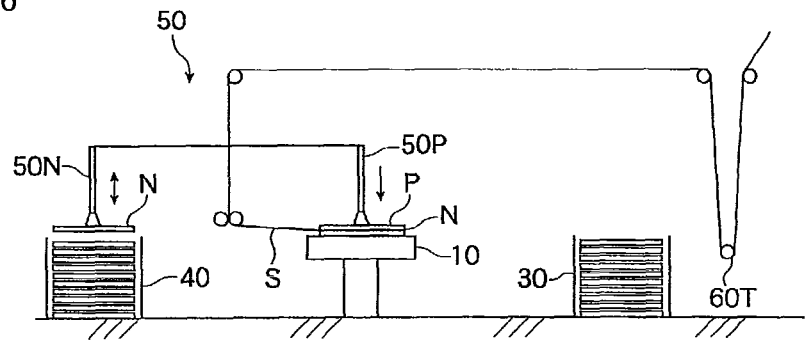
FIG. 6 is an exemplary diagram for explaining the stacking operation by the stacking device of the first embodiment of the present invention.

ST3: Next, as shown in FIG. 6, the positive electrode adsorbing pad 50P is elongated over the stacking stage 10 to stack the sheet positive electrode P on the folded separator S, and the folding guide member 20 is retracted from the stacking stage 10. At the same time, the negative electrode adsorbing pad 50N at the adsorbing position is elongated and contracted to adsorb and hold a sheet negative electrode N in the negative electrode accommodating unit 40. When the folding guide member 20 is retracted, the sheet electrodes P and N, and the separator S are held between the positive electrode adsorbing pad 50P, which is arranged between the guide sides 20R, 20L so as not to interfere with the guide member 20, and the stacking stage 10, so that no misalignment of the sheet electrodes P and N, and the separator S occur.

Figure 7:
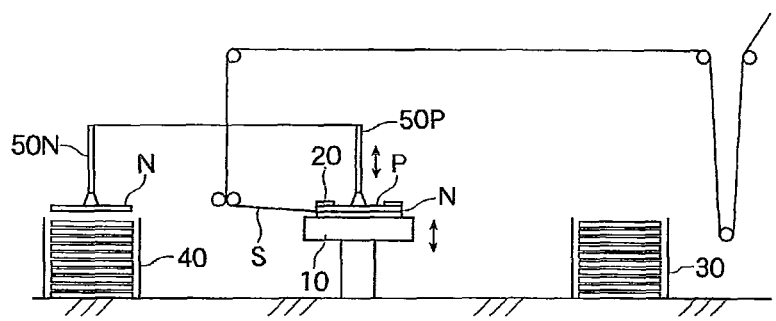
FIG. 7 is an exemplary diagram for explaining the stacking operation by the stacking device of the first embodiment of the present invention.

ST4: Next, as shown in FIG. 7, with the sheet electrodes P and N, and the separator S being held between the positive electrode adsorbing pad 50P and the stacking stage 10, the positive electrode adsorbing pad 50P and the stacking stage 10 are slightly moved down, and the folding guide member 20 is moved forward to the folding position to surely avoid any interference of the sheet electrode P, N and the separator S with the folding guide member 20. Thereafter, the stacking stage 10 is moved up again, so that the sheet negative electrode N and the sheet positive electrode P stacked with each other via the folded separator S are held between the stacking stage 10 and the folding guide member 20, and the positive electrode adsorbing pad 50P is contracted in order to avoid any interference with the guide member 20 at the time of a sliding operation.

Figure 8:
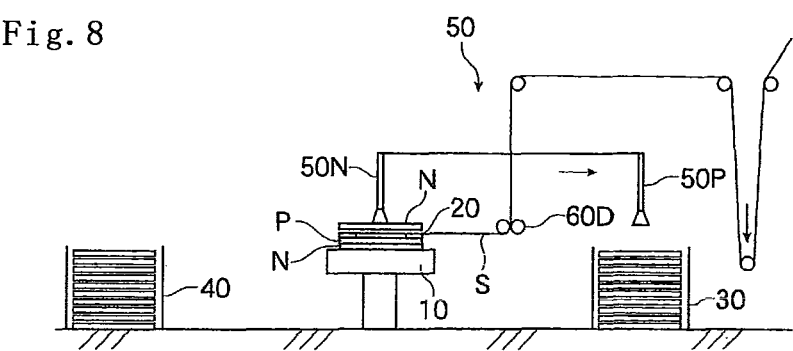
FIG. 8 is an exemplary diagram for explaining the stacking operation by the stacking device of the first embodiment of the present invention.

ST5: Next, as shown in FIG. 8, the slide reciprocating unit 50 is moved by a horizontal distance d so that the bottom roller pair 60D is moved to an opposite side of the stacking stage 10 (in the embodiment, right of the stacking stage 10). Accordingly, the separator S is folded at the predetermined folding position by the folding guide member 20, the positive electrode adsorbing pad 50P is moved to the adsorbing position, and the negative electrode adsorbing pad 50N is moved to the stacking position.

Figure 9:
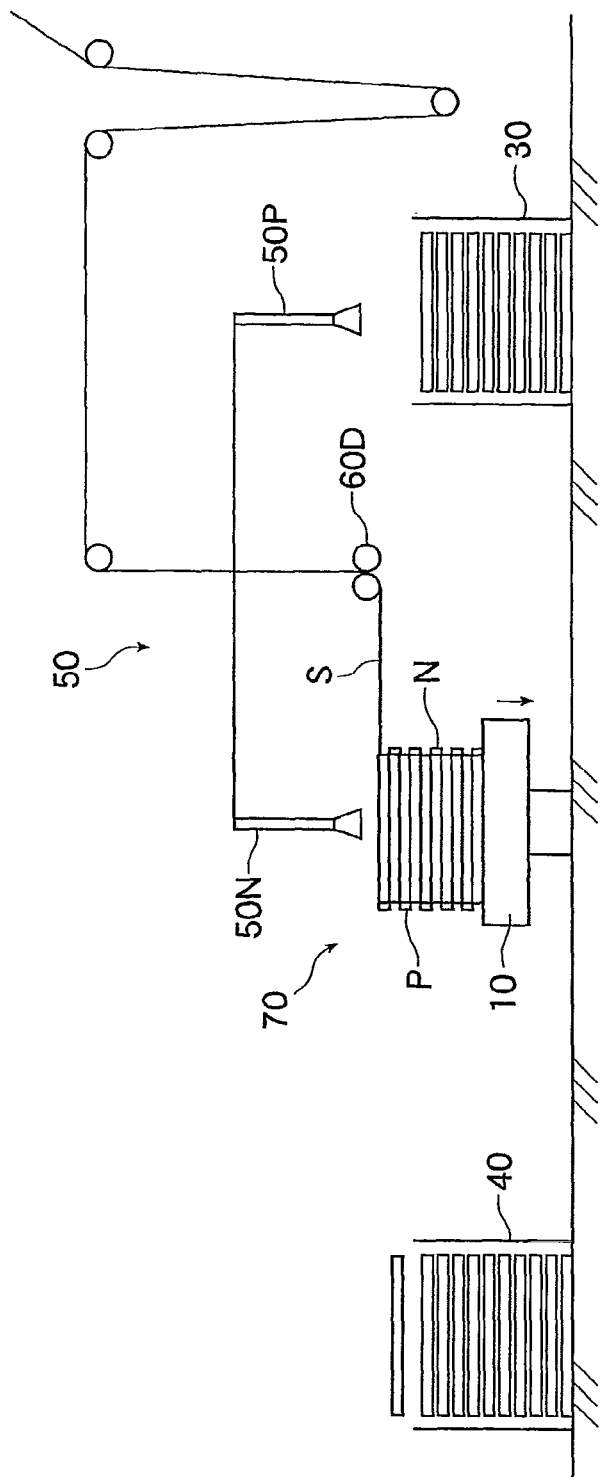
FIG. 9 is an exemplary diagram for explaining the stacking operation by the stacking device of the first embodiment of the present invention.

ST6: By repeating the foregoing steps ST1 to ST5, as shown in FIG. 9, a stacked body 70 having desired numbers (number of layers) of the sheet electrodes P and N each sandwiched between a folded portion of the successive separator S folded at constant folding positions in a zigzag manner is formed on the stacking stage 10.

ST7: When stacking of a last sheet electrode and folding of the separator S are completed, the separator S is cut in the vicinity of the bottom roller pair 60D, and a terminal treatment is performed, thereby finishing the stacked body 70.

Thereafter, the stacked body 70 is encapsulated in a desired packaging body (e.g., a can package, or a sheet package having a flexibility) together with a predetermined electrolysis solution, thereby finishing a lithium ion secondary battery.

As explained above, according to the stacking device of the present invention, a conventional cut process of a separator can be omitted, thus improving the productivity, and when the separator S is folded by the movement of the bottom roller pair 60D (slide reciprocating unit 50) which configures the separator reciprocating means, the folding guide member 20 arranged at the predetermined folding position can suppress any application of unreasonable force to an end portion (end side) of the sheet electrode P (N). At the same time, since the separator S and the sheet electrode P (N) on the stacking stage 10 are always held between the stacking stage 10 and the folding guide member 20 and/or the electrode adsorbing pad 50P (50N), it is possible to surely suppress any misalignment of the sheet positive electrode P (N) when the separator S is folded.

Moreover, the arrangement of the folding guide member 20 and that of the electrode adsorbing pad 50P (50N) are set in such a way that the projection plane of the folding guide member 20 and that of the electrode adsorbing pad 50P (50N) on the stacking stage 10 do not interfere with each other, so that when the folding guide member 20 is moved close and is moved apart relative to the stacking stage 10 while holding the stacked body 70, the folding guide member 20 can be easily and smoothly moved. Accordingly, it is possible to effectively suppress any damage to the sheet electrode when the folding guide member 20 is moved (come close or move apart) in addition to any misalignment of the sheet electrode configuring the stacked body.

Furthermore, as the bottom roller pair 60D which configures the separator reciprocating means, individual electrode adsorbing pads 50P, 50N, and the slide reciprocating unit 50 are formed together as a single unit, and as the positional relationship between the stacking stage 10 and the electrode accommodating unit 30, 40 are set to be a predetermined arrangement, a moving operation from an adsorbing position of a sheet electrode of one polarity to a stacking position, a moving operation from a stacking potion of a sheet electrode of another polarity to an adsorbing position, and an operation of folding the separator S at a predetermined folding position with constant tension can be carried out successively and simultaneously, thereby accomplishing significant improvement of the productivity.

As the separator reciprocating means and individual electrode adsorbing pads 50P, 50N are reciprocated integrally as the slide reciprocating unit 50 by means of a single drive source, it is possible to reduce the number of actuators, to significantly simplify the configuration, to make the unit compact, and to accomplish cost reduction.

In comparison with a conventional stacked body having a convolute configuration, it is possible to suppress any application of excessive force to the separator S, and any misalignment of the sandwiched sheet electrodes, and to uniformly fold the separator S with constant tension always at a constant folding position, so that any damage to the separator S is suppressed, the degree of freedom for selection of an applicable separator (e.g., inorganic material composite separator having a high heat resistance but also having a brittleness which becomes a problem at the time of folding) is increased, resulting in further improvement of a battery quality in accordance with its application.

Figure 10:
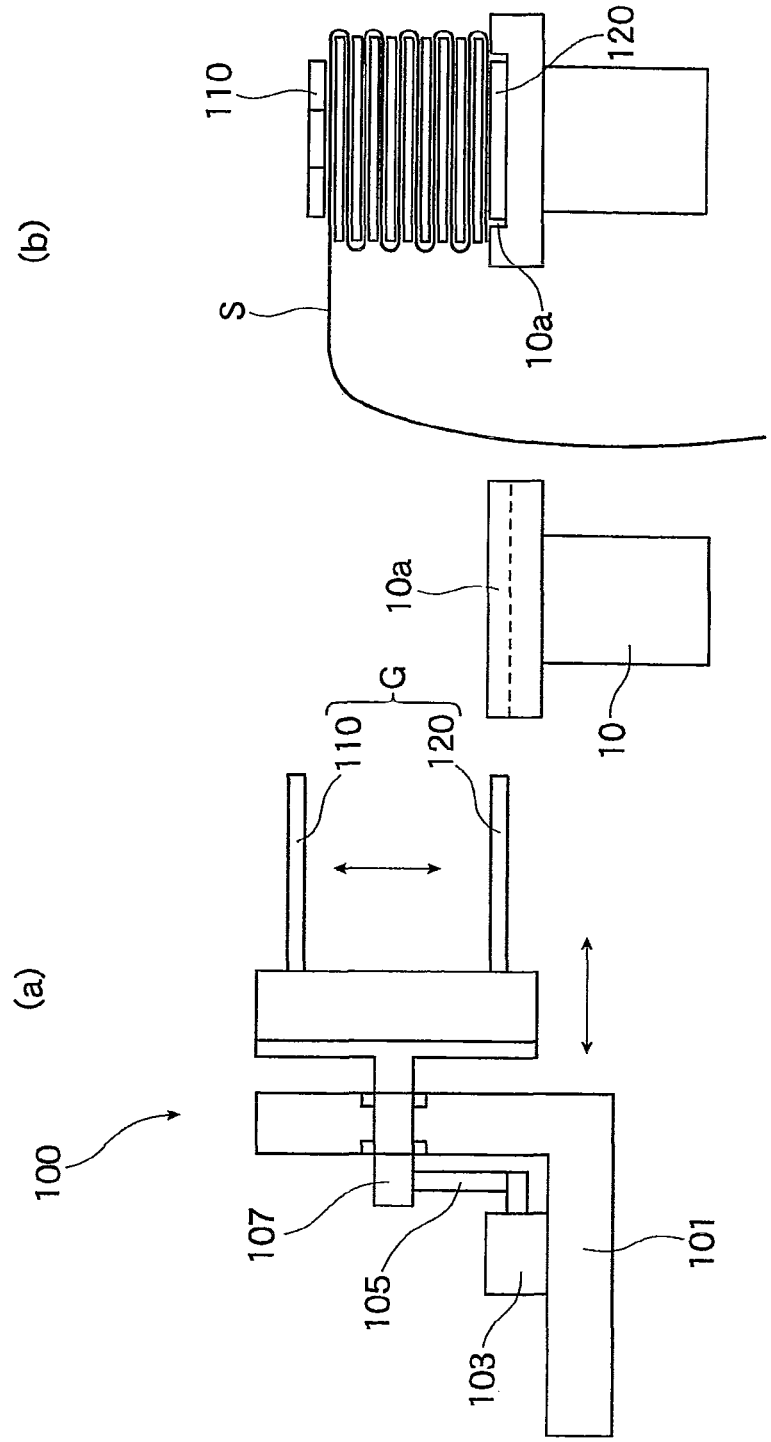
FIG. 10 is an exemplary diagram for explaining a configuration of a gripper according to a modified example of the present invention.

Next, an explanation will be given of a modified example of the foregoing embodiment in detail with reference to FIG. 10.

In general, when a terminal treatment to the separator S of the stacked body 70 having the successive separator S folded so as to suppress any misalignment of the sheet electrode P, N is manually carried out, the stacked body is likely to be accidentally damaged and the sheet electrode P, N is likely to be misaligned.

According to the modified example of the foregoing embodiment, in order to do a finishing treatment to the stacked body 70 having the successive separator S folded in a zigzag manner, and the sheet electrodes P, N, a gripper unit which is gripping means for rotatably grasping the stacked body 70 formed on the stacking stage 10 is further provided. FIG. 10(a) is an exemplary side view for explaining a configuration of the gripper unit of the modified example, while FIG. 10(b) is an exemplary front view showing a condition that the stacked body 70 formed on the stacking stage 10 is grasped by the gripper.

As shown in FIG. 10(a), a gripper unit 100 has, for example, a substantially-L-shaped slider 101 which can move back and forth relative to the stacking stage 10, a rotation shaft 107 which passes all the way through a vertical portion of the slider 101, is rotatably supported by a bearing or the like, is rotated and driven by a motor 103, a gear 105 that are integrally mounted on the slider 101, and has a substantially-T-shaped cross section, and a gripper G which is attached to a leading end of the rotation shaft 107, and can open/close in the vertical direction by means of an air source. The gripper G has a tabular upper gripper 110 and a tabular bottom gripper 120. The shape of the upper gripper 110 can be one which avoids any interference with the electrode adsorbing pad 50P (50N) when approaching the stacking stage 10, and which can hold the stacked body 70 with the bottom gripper 120, and, for example, a tabular shape like a rectangle having one side omitted may be arbitrarily selected in accordance with the arrangement of the electrode adsorbing pad 50P (50N).

The stacking stage 10 of the modified example has a concaved groove 10a which is formed at the center thereof, and into which the tabular bottom gripper 120 can be inserted in the travelling direction of the gripper G. The folding guide member 20 has a degree of freedom (e.g., moving mechanism in the vertical direction) which enables movement to a predetermined retract position so that the folding guide member 20 does not interfere with the gripper G when it moves forward/backward relative to the stacking stage 10.

An explanation will be given of a manufacturing process of a secondary battery when such a gripper unit 100 is provided. Note that the process of forming the stacked body 70 having the desired numbers of stacked sheet electrodes P, N via the separator S on the stacking stage 10 is same as the foregoing process (ST0 to ST6) other than a terminal treatment at a finishing step, and thus the explanations will be omitted.

ST7': The stacked body 70 having the desired numbers of sheet electrodes is formed on the stacking stage 10, and is held between the electrode adsorbing pad 50P (50N) and the stacking stage 10 to suppress any misalignment of the sheet electrode P (N). At this time, the stacking stage 10 is moved down so that the separator at the top layer is positioned at a predetermined position (height) in accordance with the number of stacked sheet electrodes P, N, and the gripper unit 100 has the gripper G opened so that the bottom gripper 120 is positioned at a position (height) that the bottom gripper 120 can be inserted into the groove 10a of the stacking stage 10.

ST8: The gripper unit 100 is moved forward, the bottom gripper 120 is inserted into the groove 10a of the stacking stage 10, the gripper G is closed to grasp the stacked body 70, and the separator S is cut at an arbitrary portion (see FIG. 10(b)).

ST9: Subsequently, the stacking stage 10 is moved down, and the electrode adsorbing pad 50P (50N) is moved up to secure a space where the stacked body 70 can be rotated. As the rotation shaft 107 of the gripper unit 100 rotates, the stacked body 70 grasped by the gripper G is rotated, and the separator S is wound around the circumference of the stacked body 70, so that any occurrence of misalignment of the sheet electrode P, N present inside the stacked body 70 at the finishing step is suppressed, and stable positioning can be accomplished. Thereafter, a terminal treatment like bonding is performed on an end portion of the separator S, thereby finishing the stacked body 70 having an internal electrode pair.

By providing such a gripper unit 100, the configuration and controlling become complex as the gripping means is added and the degree of freedom is added to the folding guide member 20, but a manual work can be eliminated as much as possible at a finishing step for the stacked body 70 formed on the stacking stage 10, so that it becomes possible to improve the productivity and to suppress any deterioration of a quality inherent to a manual work.

Figure 11:
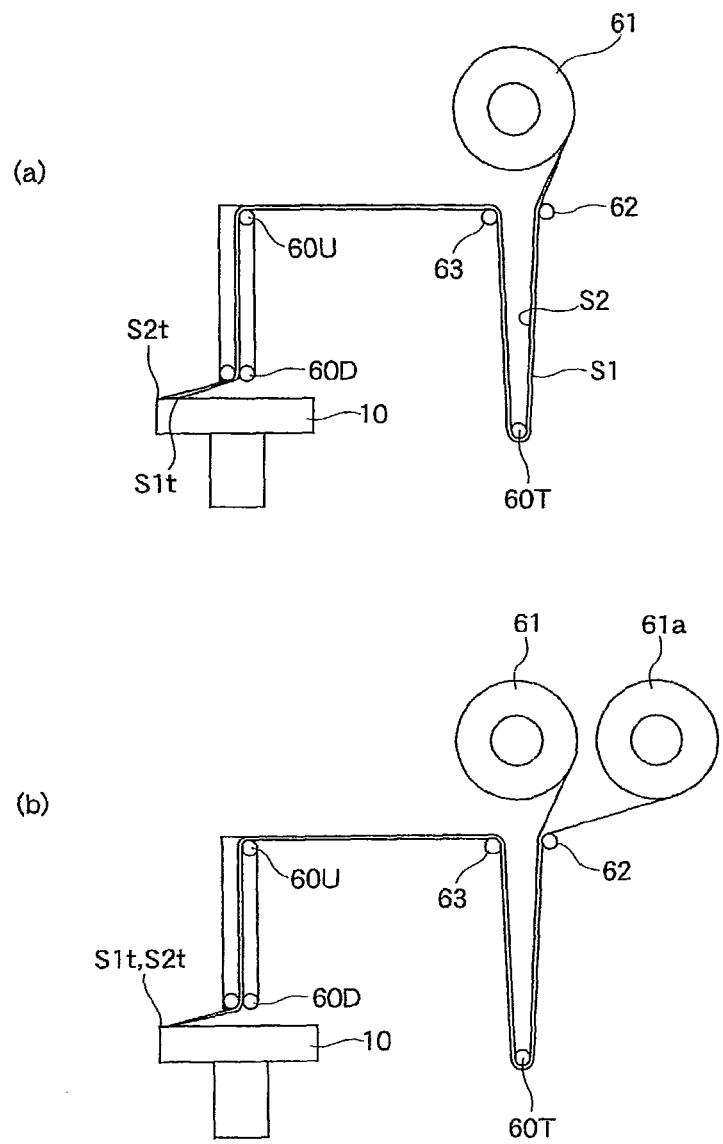
FIG. 11 is an exemplary diagram showing multiplex separators hung across plural rollers according to another modified example of the present invention.

Next, an explanation will be given of another modified example of the foregoing embodiment in detail with reference to FIG. 11.

In another modified example, the tape-like separator S is multiplexed in order to stably maintain the quality of the stacked body 70 even if there is a defect like a pinhole in the separator S by any possibility. FIG. 11 is an exemplary diagram showing only members and units relating to a supplying unit of the separator S for the purpose of simplification.

As shown in FIG. 11(a), in this modified example, plural pieces of tape separators (e.g., two separators S1, S2) are wound around the tape unit 61 in an overlapping (stacked) condition, and the multiplex separators S1, S2 are hung across plural rollers, and are fed to the stacking stage 10. Note that regarding fixation of the multiplex separators S1, S2 on the stacking stage 10, respective leading ends S1$t$, S2$t$ of the separators S1, S2 may be slightly shifted with each other on the stacking stage 10, and the respective leading ends S1$t$, S2$t$ may be adsorbed and fixed by air. Alternatively, only the leading ends S1$t$, S2$t$ may be connected together by bonding or the like, and the connected leading ends S1$t$, S2$t$ may be collectively adsorbed and fixed by air (see FIG. 11(b)).

As shown in FIG. 11(b), plural tape units 61, 61a may be provided for each of the separators S1, S2. According to such a configuration, various multiplexing like a change in the number of stacked tape separators S1, S2 can be realized more easily. Note that the multiplexing number (stacked number) of the separators S can be set arbitrarily.

As explained above, according to the stacking device of the present invention, it is possible to flexibly cope with changes in the material, configuration, and the like of the separator S, so that multiplex separators S1, S2 like another modified example can be easily realized, thereby further contributing improvement of the quality of the stacked body 70 and the reliability thereof.

Second Embodiment

Next, an explanation will be given of a stacking device according to the second embodiment of the present invention with reference to FIG. 12. FIG. 12(a) is an exemplary front view showing a whole configuration of a stacking device of the present invention, while FIG. 12(b) is an exemplary plane view. FIG. 12(a) shows that a separator is hung across plural rollers and fed to a stacking stage, while FIG. 12(b) shows a state that the separator is omitted for the purpose of clarification.

In comparison with the configuration of the previous embodiment that the electrode adsorbing pads 50P, 50N reciprocate together with the bottom roller pair 60D which configures the separator reciprocating means, a stacking device 1A of the second embodiment employs a configuration that a movement locus of each of the electrode adsorbing pads 50P, 50N draws a circular orbit independent from the bottom roller pair 60D. Members and units having the same functions as those of the foregoing embodiment will be denoted by the same reference numerals, and detailed explanations thereof will be omitted.

Figure 12:
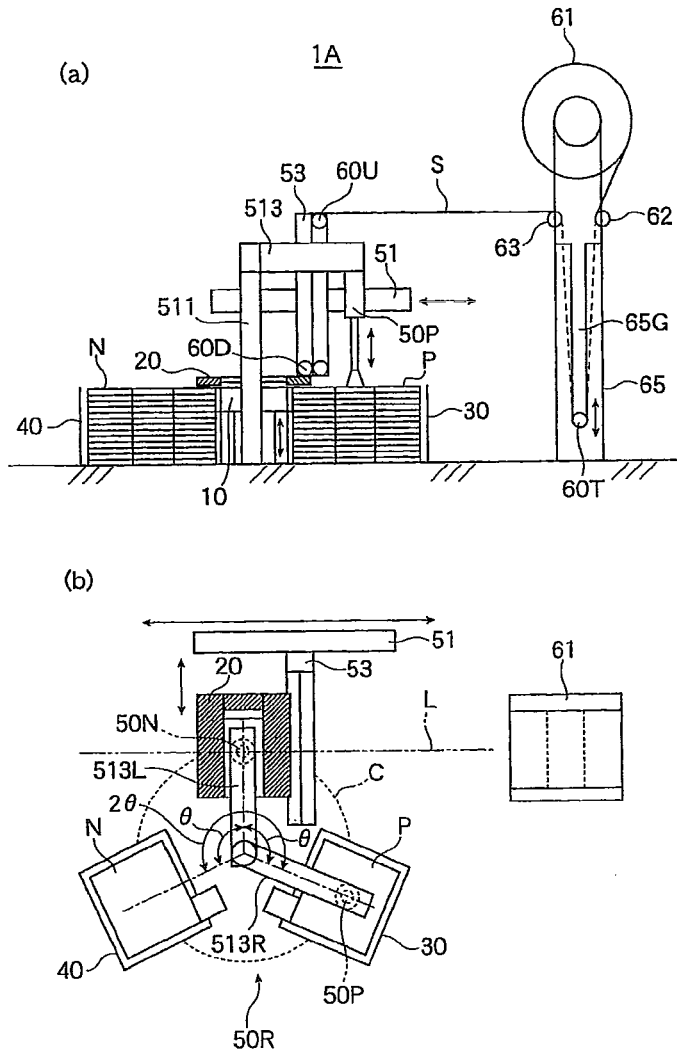
FIG. 12 is an exemplary diagram showing a whole configuration of a stacking device according to a second embodiment of the present invention.

As shown in FIG. 12, the stacking device 1A of the present invention comprises a successive tape-like separator S hung across plural rollers, a stacking stage 10 on which a sheet positive electrode P and a sheet negative electrode N are alternately stacked on a successive tape-like separator S, and which can move up and down, a folding guide member 20 which can move back and forth (come close and come off) relative to the stacking stage 10 while maintaining a predetermined height, and which guides sequential folding of the separator S in a zigzag manner at a predetermined position (height), a slide reciprocating unit 50 which is provided above the stacking stage 10, and which can reciprocates at an arbitrary stroke relative to the stacking stage 10, a rotational reciprocating unit 50R which is provided ahead of the stacking stage 10, and which can rotate within an arbitrary angular range, a positive electrode accommodating unit 30 which is arranged in a predetermined orbit of the rotational reciprocating unit 50R, and which accommodates plural sheet positive electrodes P, a negative electrode accommodating unit 40 which is arranged in the predetermined orbit of the rotational reciprocating unit 50R, and which accommodates plural sheet negative electrodes N, and a non-illustrated device controller which controls operations of those units.

The slide reciprocating unit 50 of the second embodiment has a slide member 51 which can reciprocate in the horizontal direction at the back face side of the stacking stage 10. The slide member 51 has a vertical arm 53 which is attached to the substantial center thereof, and which extends in the vertical direction. The vertical arm 53 has an upper roller 60U which is attached to an upper end thereof in such a manner as to substantially-horizontally protrude along the stacking stage 10, and across which the separator S is hung. The vertical arm 53 also has a bottom roller pair 60D which is attached to a bottom end thereof and which substantially-horizontally protrudes along the stacking stage 10 in the vicinity of a top surface of the stacking stage 10.

Conversely, the rotational reciprocating unit 50R of the second embodiment has a rotation supporting member 511 which is arranged in a standing condition ahead of the stacking stage 10, and which is freely rotatable, a curved arm 513 which is attached to a top of the rotation supporting member 511, and which is formed in a dogleg shape at an arbitrary curve angle, and a positive electrode adsorbing pad 50P and a negative electrode adsorbing pad 50N each of which is provided at a leading end of the curved arm 513, and which configures electrode holding/moving means. More specifically, as is most clearly shown in FIG. 12(b), the curved arm 513 has a right arm 513R and a left arm 513L each extending in the horizontal direction, and the right arm 513R has the positive electrode adsorbing pad 50P attached to the leading end thereof, adsorbing and holding a sheet positive electrode P from the positive electrode accommodating unit 30 to move and feed it to the stacking stage 10, and being telescopic in the vertical direction. Likewise, the left arm 513L has the negative electrode adsorbing pad 50N attached to the leading end thereof, adsorbing and holding a sheet negative electrode N from the negative electrode accommodating unit 40 to move and feed it to the stacking stage 10, and being telescopic in the vertical direction. The dogleg curved arm 513 has a joining portion (curved portion of the curved arm 513) of the right arm 513R and the left arm 513L which is integrally and rotatably attached to the rotation supporting member 511, and is formed in such a way that an open angle (an angle relative to a rotation center between both electrode adsorbing pads 50P, 50N respectively attached to the leading end of the curved arm 513) θ between the right arm 513R and the left arm 513L can be adjusted and changed arbitrarily. That is, according to the stacking device 1A of the second embodiment, the upper roller 60U and the bottom roller pair 60D are formed together with the slide reciprocating unit 50, while the respective electrode adsorbing pads 50P, 50N are formed together with the rotational reciprocating unit 50R. Each of the reciprocating units 50, 50R can independently move, and the open angle θ between respective electrode adsorbing pads 50P, 50N can be set arbitrarily.

Furthermore, according to the stacking device 1A of the second embodiment, as is most clearly shown in FIG. 12(b), the rotational reciprocating unit 50R has the rotation supporting member 511, the curved arm 513, and the like which are set to have an arrangement position and a length in such a way that a circular orbit C (dashed line C in FIG. 12(b)) drawn by each of the electrode adsorbing pads 50P, 50N attached to the leading end of the curved arm 513 passes through the substantial center of the stacking stage 10 when the rotation supporting member 511 is rotated. More specifically, the circular orbit C is set in such a manner as to contact a central line L (two-point dashed line in FIG. 12(b)) along the moving direction of the separator S at the substantial center of the stacking stage 10, and likewise, the positive electrode accommodating unit 30 and the negative electrode accommodating unit 40 are arranged in such a way that the respective centers thereof are on the circular orbit C. An arrangement angle between each electrode accommodating unit 30, 40 and the stacking stage 10 (an angle between each electrode accommodating unit 30, 40 and the stacking stage 10 on the circular orbit C relative to the rotation center) is set to be θ which is equal to the open angle θ of the curved arm 513, and the electrode adsorbing pad 50P, 50N reciprocatingly rotates on the predetermined circular orbit C within a predetermined angular range 2θ between the corresponding electrode accommodating unit 30, 40 and the stacking stage 10.

As explained above, the slide reciprocating unit 50 having the roller pair 60D configuring the separator reciprocating means and the rotational reciprocating unit 50R having the electrode adsorbing pads 50P, 50N each configuring the electrode holding/moving means are so configured as to be independently driven, and the positional relationship relative to the electrode accommodating unit 30, 40 is set to be a predetermined arrangement, so that as will be explained in detail later, an operation of supplying a sheet electrode of one polarity to the stacking stage 10, a moving operation to the electrode accommodating unit of a sheet electrode of another polarity, and an operation of folding the separator S at a predetermined position can be substantially-simultaneously carried out, the productivity is significantly improved, a reciprocating stroke of the separator S and a stack timing of the sheet electrode P, N can be set arbitrarily, and it becomes possible to flexibly cope with changes in the sizes, shapes, and the like of the sheet electrode P, N and the separator S in accordance with an application.

Next, an explanation will be given of an operation of the stacking device of the second embodiment having the foregoing structure with reference to FIGS. 13 to 19. Note that the rotation supporting member 511 of the rotational reciprocating unit 50R is omitted in each figure for the purpose of clarification.

Figure 13:
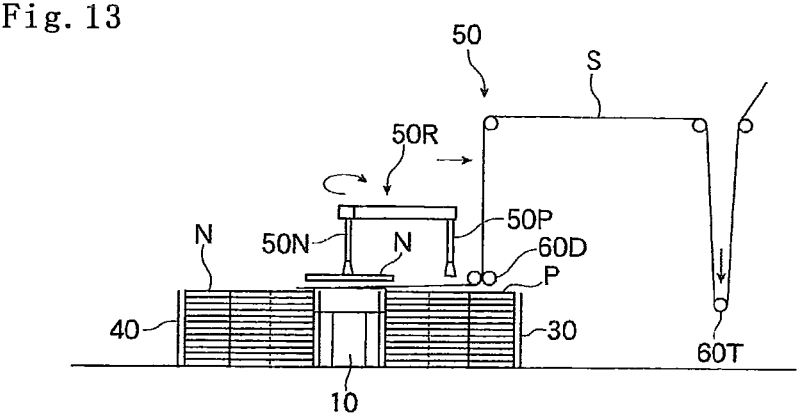
FIG. 13 is an exemplary diagram for explaining a stacking operation by the stacking device of the second embodiment of the present invention.

ST10: First, as an initial condition, like the foregoing embodiment, a leading end of the separator S hung across the plural rollers is manually guided over the stacking stage 10, and is adsorbed and fixed by air from the underneath of the stacking stage 10. At this time, the stacking stage 10 is moved down at a height lower than a height that folding of the separator S is possible, the folding guide member 20 is retracted from the stacking stage 10, and the bottom roller pair 60D is moved to a side of the stacking stage 10 (in the embodiment, the right side of the stacking stage 10). Next, as shown in FIG. 13, with one electrode adsorbing pad (e.g., the negative electrode adsorbing pad 50N) being adsorbing a sheet negative electrode N, the rotational reciprocating unit 50R is rotated in a predetermined direction (in the embodiment, clockwise direction) so that the negative electrode adsorbing pad 50N is positioned at a stacking position over the stacking stage 10 where stacking of the sheet negative electrode N becomes possible. At this time, since the open angle between the electrode adsorbing pads 50P, 50N is set to be the angle θ which is equal to the arrangement angle between each electrode accommodating unit 30, 40 and the stacking stage 10, another electrode adsorbing pad (e.g., the positive electrode adsorbing pad 50P) is automatically moved to an adsorbing position over the positive electrode accommodating unit 30 where adsorption of a corresponding sheet positive electrode P is possible. When the slide reciprocating unit 50 moves in the horizontal direction (e.g., from left to right), like the foregoing embodiment, the tension roller 60T moves in the vertical direction (e.g., from up to down).

Figure 14:
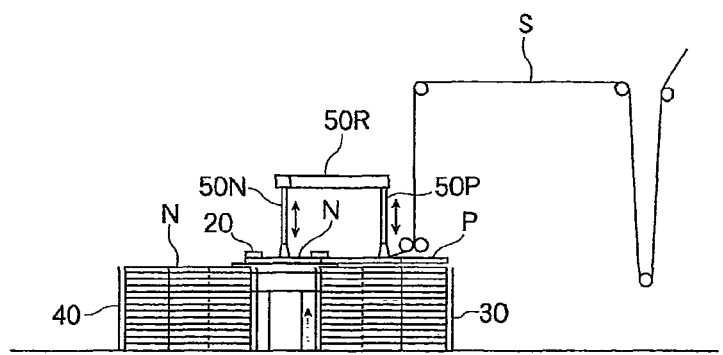
FIG. 14 is an exemplary diagram for explaining the stacking operation by the stacking device of the second embodiment of the present invention.

ST11: Subsequently, as shown in FIG. 14, like the foregoing embodiment, the negative electrode adsorbing pad 50N holding the sheet negative electrode N is elongated over the stacking stage 10 to press the separator S against the stacking stage 10 via the sheet negative electrode N, and the positive electrode adsorbing pad 50P at the adsorbing position is elongated and contracted to adsorb and hold a sheet positive electrode P in the positive electrode accommodating unit 30. At the same time, the folding guide member 20 is moved forward to a folding position above the stacking stage 10 where folding of the separator S is possible, and the stacking stage 10 is moved up to hold the separator S and the sheet negative electrode N between the stacking stage 10 and the folding guide member 20, and, the negative electrode adsorbing pad 50N is contracted in order to avoid any interference with the guide member 20 at the time of a rotational operation.

Figure 15:
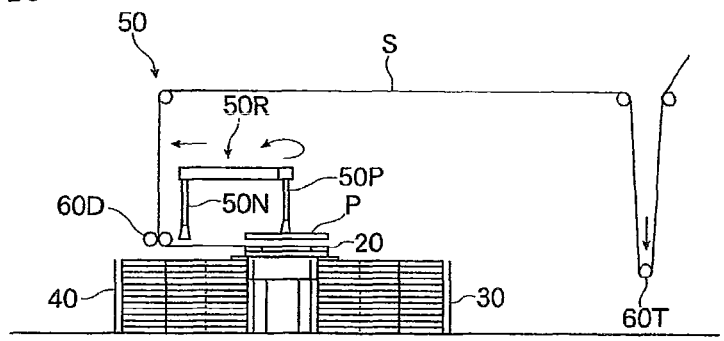
FIG. 15 is an exemplary diagram for explaining the stacking operation by the stacking device of the second embodiment of the present invention.

ST12: Next, as shown in FIG. 15, the slide reciprocating unit 50 is slid by an arbitrary stroke so that the bottom roller pair 60D is moved to an opposite side of the stacking stage 10 (in the embodiment, left of the stacking stage 10), and the separator S is folded at a predetermined folding position by the folding guide member 20. At the same time, the rotational reciprocating unit 50R is rotated by θ in a predetermined direction (in the embodiment, counterclockwise direction) to move the negative electrode adsorbing pad 50N to the adsorbing position and to move the positive electrode adsorbing pad 50P to the stacking position. Accordingly, an operation of moving the positive electrode adsorbing pad 50P from the adsorbing position to the stacking position, an operation of moving the negative electrode adsorbing pad 50N from the stacking position to the adsorbing position, and an operation of folding the separator S at the predetermined folding position with constant tension are simultaneously carried out, thus improving the productivity significantly. Moreover, since the slide reciprocating unit 50 and the rotational reciprocating unit 50R independently move on respective trajectories, the reciprocating stroke of the separator S and the stack timing of the sheet electrode P, N can be set arbitrarily, so that it becomes possible to flexibly cope with changes in the sizes, shapes, materials, and the like of the sheet electrode P, N, and the separator S more appropriately in accordance with an application.

Figure 16:
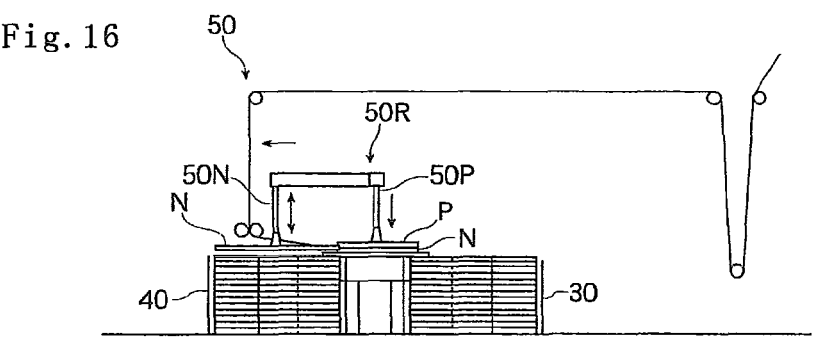
FIG. 16 is an exemplary diagram for explaining the stacking operation by the stacking device of the second embodiment of the present invention.

ST13: Next, as shown in FIG. 16, the positive electrode adsorbing pad 50P is elongated over the stacking stage 10 to stack the sheet positive electrode P on the folded separator S, and the folding guide member 20 is retracted from the stacking stage 10. At the same time, the negative electrode adsorbing pad 50N at the adsorbing position is elongated and contracted to adsorb and hold a sheet negative electrode N in the negative electrode accommodating unit 40. When the folding guide member 20 is retracted, the sheet electrodes P, N and the separator S are held between the positive electrode adsorbing pad 50P arranged between the guide sides 20R, 20L of the guide member 20 and the stacking stage 10, so that no misalignment of the sheet electrodes P, N and the separator S occur.

Figure 17:
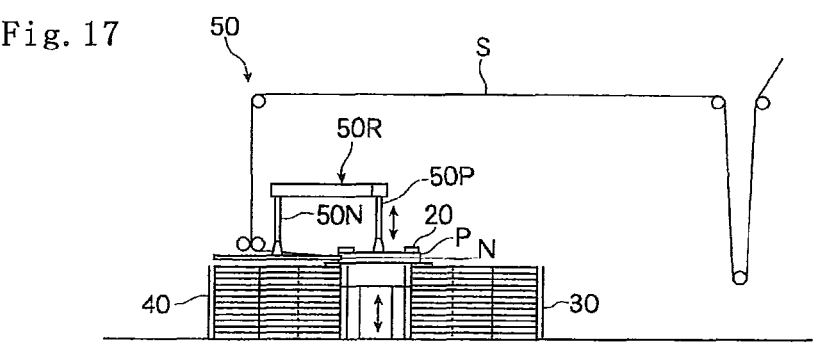
FIG. 17 is an exemplary diagram for explaining the stacking operation by the stacking device of the second embodiment of the present invention.

ST14: Subsequently, as shown in FIG. 17, in order to surely avoid any interference with the folding guide member 20, with the sheet positive electrodes P, N and the separator S being held between the positive electrode adsorbing pad 50P and the stacking stage 10, the positive electrode adsorbing pad 50P and the stacking stage 10 are slightly moved down, and the folding guide member 20 is moved forward to the folding position. Thereafter, the stacking stage 10 is moved up again to hold the sheet negative electrode N and the sheet positive electrode P stacked with each other via the folded separator S between the stacking stage 10 and the guide member 20, and the positive electrode adsorbing pad 50P is contracted in order to avoid any interference with the guide member 20 at the time of a rotational operation.

Figure 18:
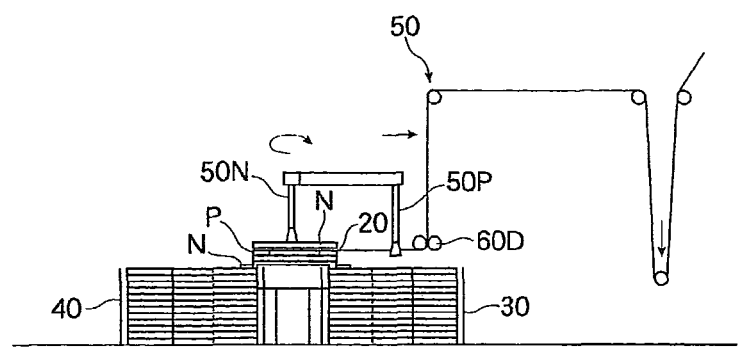
FIG. 18 is an exemplary diagram for explaining the stacking operation by the stacking device of the second embodiment of the present invention.

ST15: Next, as shown in FIG. 18, the slide reciprocating unit 50 is slid by an arbitrary stroke so that the bottom roller pair 60D is moved to an opposite side of the stacking stage 10 (in the embodiment, right of the stacking stage 10), and separator S is folded by the folding guide member 20 at the predetermined folding position. At the same time, the rotational reciprocating unit 50R is rotated by θ in a predetermined direction (in the embodiment, clockwise direction) to move the positive electrode adsorbing pad 50P to the adsorbing position and to move the negative electrode adsorbing pad 50N to the stacking position.

Figure 19:
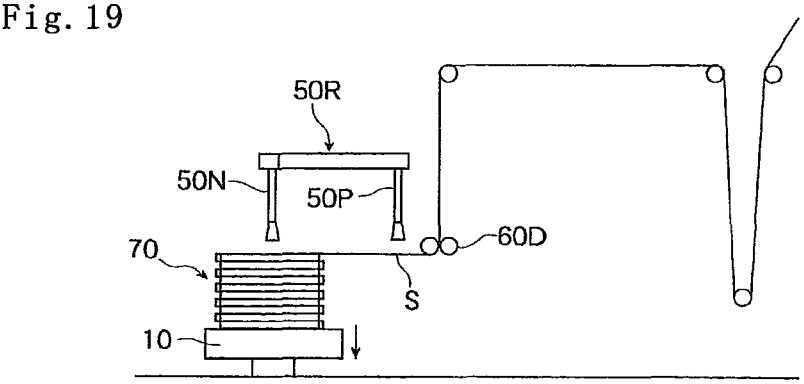
FIG. 19 is an exemplary diagram for explaining the stacking operation by the stacking device of the second embodiment of the present invention.

ST16: By repeating the foregoing steps ST11 to ST15, as shown in FIG. 19, a stacked body 70 having the desired number (number of layers) of sheet electrodes P, N each sandwiched between a folded portion of the successive separator S folded in a zigzag manner at the constant folding positions is formed on the stacking stage 10 like the foregoing embodiment. Thereafter, like the foregoing embodiment, a terminal treatment is performed, and the stacked body 80 is encapsulated in a desired packaging body (e.g., a can package, a flexible sheet package) together with a predetermined electrolysis solution, thereby finishing a lithium ion secondary battery.

According to the stacking device 1A of the second embodiment having the foregoing structure, as the bottom roller pair 60D configuring the separator reciprocating means and individual electrode adsorbing pads 50P, 50N are independently driven and controlled, the folding timing of the separator S at the predetermined position and the stack timing of the sheet electrode P, N can be adjusted and controlled precisely, resulting in improvement of the quality of the stacked body 70. Moreover, since the reciprocating stroke of the separator S and the stack timing of the sheet electrode P, N can be arbitrarily changed, it is possible to flexibly cope with changes in the materials, shapes, and sizes of the sheet electrode P, N, and the separator S in accordance with an application.

As shown in FIG. 12(b), when the electrode adsorbing pad of one polarity (in the embodiment, the negative electrode adsorbing pad 50N) is rotated and moved to the stacking position, the positive electrode adsorbing pad 50P of another polarity is moved to the adsorbing position, and the bottom roller pair 60D configuring the separator reciprocating means is configured to reciprocate over the stacking stage 10 independently from those electrode adsorbing pads, so that the configuration and the control become complex in comparison with the foregoing embodiment, but like the foregoing embodiment, an operation of moving a sheet electrode of one polarity from the adsorbing position to the stacking position, an operation of moving a sheet electrode of another polarity from the stacking position to the adsorbing position, and an operation of folding the separator S at the predetermined position with constant tension can be carried out simultaneously, resulting in significant improvement of the productivity.

Furthermore, as the curved arm 83 is configured in such a way that the open angle θ of each of the electrode pads 50P, 50N can be changed arbitrarily, it is possible to easily cope with a change in the arrangement position of each of the electrode adsorbing pads 50P, 50N, and a change in the stack timing of the sheet electrode P, N.

Although the explanation has been given of an example case where a lithium ion secondary battery is manufactured in the foregoing embodiments, a stacking device of the present invention can be deservedly applied to not only manufacturing of such a battery but also manufacturing of a stacked body having the same configuration. For example, the present invention can be easily applied to manufacturing of an electric double layer capacitor when each sheet electrode is formed of an aluminum foil with carbon materials like activated charcoal coated on a surface of the aluminum foil. Needless to say, the members, means, and the units explained in the foregoing embodiments can be appropriately combined together to carry out the present invention (e.g., a combination of the gripper unit 100, the multiplex separator, and the stacking device 1A of the second embodiment).

The invention claimed is:

1. A device for stacking a successive tape-shaped separator and a sheet electrode, the device sequentially stacking the separator and the sheet electrode while folding the successive separator to form a stacked body, and the device comprising:
   a stacking stage which holds a leading end of the tape shaped separator and on which the sheet electrode and the separator are sequentially stacked;
   separator reciprocating means for reciprocating the tape-shaped separator above the stacking stage with the stacking stage being as a center; and
   a folding guide member which comes close or moves apart relative to the stacking stage along is perpendicular direction to a moving direction of the separator so as to cover sides of both ends of the stacked sheet electrode, the sides being in the moving direction of the separator, and which guides folding of the separator accompanied by a reciprocal movement of the separator at both ends of the sheet electrode, wherein
   the separator is folded by the folding guide member which is configured to cover and protect an end portion of the sheet electrode when the separator is folded.

2. The stacking device according to claim 1, wherein the separator reciprocating means comprises a roller pair that the tape-shaped separator is inserted therebetween, the roller pair being configured to reciprocate along the stage surface with the stacking stage being as a center.

3. The stacking device according to claim 1 or 2, further comprising:
   a positive electrode accommodating unit which accommodates plural sheet positive electrodes;
   a negative electrode accommodating unit which accommodates plural sheet negative electrodes;
   positive electrode holding/moving means for holding a sheet positive electrode one by one in the positive electrode accommodating unit, and for moving and supplying the sheet positive electrode on the stacking stage; and
   negative electrode holding/moving means for holding a sheet negative electrode one by one in the negative electrode accommodating unit, and for moving and supplying the sheet negative electrode on the stacking stage, wherein
   the separator reciprocating means, the positive electrode holding/moving means, and the negative electrode holding/moving means reciprocate in an integrated manner on a same straight line.

4. The stacking device according to claim 3, wherein
   the separator reciprocating means is arranged at a center between the positive electrode holding/moving means and the negative electrode holding/moving means,
   the stacking stage is arranged at a center between the positive electrode accommodating unit and the negative electrode accommodating unit, and
   an offset distance in a horizontal direction between the separator reciprocating means and each of the electrode holding/moving means is set to be a half of an offset distance in a horizontal direction between the stacking stage and each of the electrode accommodating units.

5. The stacking device according to claim 1 or 2, further comprising:
   a positive electrode accommodating unit which accommodates plural sheet positive electrodes;
   a negative electrode accommodating unit which accommodates plural sheet negative electrodes;

positive electrode holding/moving means for holding a sheet positive electrode one by one in the positive electrode accommodating unit, and for moving and supplying the sheet positive electrode on the stacking state;

negative electrode holding/moving means for holding a sheet negative electrode one by one in the negative electrode accommodating unit, and for moving and supplying the sheet negative electrode on the stacking stage, and wherein the positive electrode holding/moving means and the negative electrode holding/moving means reciprocate in an integrated manner on a circular orbit which contacts a trajectory of the separator reciprocating means at a center of the stacking stage.

6. The stacking device according to claim 5, wherein the positive electrode accommodating unit and the negative electrode accommodating unit are arranged on the circular orbit, and an open angle between the positive electrode holding/moving means and the negative electrode holding/moving means is set to be equal to an arrangement angle between the stacking stage and each of the electrode accommodating units.

7. The stacking device according to claim 6, wherein the open angle between the positive electrode holding/moving means and the negative electrode holding/moving means can be changed arbitrarily.

8. The stacking device according to claim 3, wherein the folding guide member and/or any one of the electrode holding/moving means are always holding a stacked body with the stacking stage when the stacked body is formed on the stacking stage.

9. The stacking device according to claim 8, wherein each the foregoing units and means are arranged such that a projection plane of the folding guide member and that of a leading end of the electrode holding/moving means on the stacking stage do not interfere with each other.

10. The stacking device according to claim 1 or 2, wherein the tape-shaped separator is hung across plural rollers, and at least one of the plural rollers is movable in a direction of gravitational force.

11. The stacking device according to claim 1 or 2, wherein the stacking stage has a height adjustable in accordance with the number of stacked sheet electrodes.

12. The stacking device according to claim 1 or 2, further comprising gripping means for gripping both ends of a stacked body in a stacking direction, the stacked body comprising a separator and a sheet electrode both stacked on the stacking stage, and wherein the gripping means comprises a rotation mechanism which enables winding of the separator around a circumference of the stacked body.

13. The stacking device according to claim 1 or 2, wherein the separator is multiplexed by stacking plural tape-shaped separators each of which is successive.

14. The stacking device according to claim 1 or 2, wherein the separator is formed of a complex material of inorganic chemical compounds or wholly aromatic polyamide material.

15. The stacking device according to claim 3, wherein the sheet positive electrode is a lithium-ion-battery positive electrode comprising a metal foil having both side surfaces coated with a cathode active material, and the sheet negative electrode is a lithium-ion-battery positive electrode comprising a metal foil having both side surfaces coated with an anode active material.

16. The stacking device according to claim 1, wherein the folding guide member is formed of two opposing members each having a U-shape.

* * * * *